United States Patent
Bala et al.

(10) Patent No.: US 7,639,260 B2
(45) Date of Patent: Dec. 29, 2009

(54) CAMERA-BASED SYSTEM FOR CALIBRATING COLOR DISPLAYS

(75) Inventors: Raja Bala, Webster, NY (US); Karen M. Braun, Fairport, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 682 days.

(21) Appl. No.: 11/012,993

(22) Filed: Dec. 15, 2004

(65) Prior Publication Data

US 2006/0126138 A1   Jun. 15, 2006

(51) Int. Cl.
  G03F 3/08   (2006.01)
  G09G 5/00   (2006.01)
  G09G 5/06   (2006.01)
  G06K 9/00   (2006.01)
  G06K 9/40   (2006.01)
  G06T 1/00   (2006.01)
  H04N 1/46   (2006.01)
  H04N 1/60   (2006.01)

(52) U.S. Cl. .................. 345/581; 345/589; 345/428; 345/600; 345/606; 348/47; 348/153; 348/187; 348/211.11; 358/504; 358/518; 358/525; 382/162; 382/167; 382/165; 382/274

(58) Field of Classification Search .............. 345/426, 345/428, 581, 589, 600, 606, 618, 619, 650, 345/549, 552; 348/46–48, 153, 159, 169, 348/174, 180, 254, 187–189, 211.11, 211.6, 348/182, 185; 382/162–167, 254, 274, 276, 382/300, 204; 358/504, 518, 519, 525; 250/252.1; H04N 1/46; G03F 3/08

See application file for complete search history.

(56) References Cited

U.S. PATENT DOCUMENTS

| | | | | |
|---|---|---|---|---|
| 5,754,184 | A | * 5/1998 | Ring et al. | 345/604 |
| 6,215,562 | B1 | 4/2001 | Michel et al. | |
| 6,585,340 | B1 | 7/2003 | Borrell | |
| 6,766,050 | B1 | * 7/2004 | Saikawa et al. | 382/162 |
| 2004/0114041 | A1 | * 6/2004 | Doyle et al. | 348/182 |
| 2004/0218804 | A1 | * 11/2004 | Affleck et al. | 382/141 |
| 2006/0280360 | A1 | * 12/2006 | Holub | 382/162 |
| 2007/0229666 | A1 | * 10/2007 | Berestov et al. | 348/187 |
| 2007/0255957 | A1 | * 11/2007 | Arnone et al. | 713/182 |

(Continued)

OTHER PUBLICATIONS

Kwak et al., "Method for characterizing an LCD projection display", 2001, SPIE, pp. 110-118.*

(Continued)

Primary Examiner—Wesner Sajous
(74) Attorney, Agent, or Firm—Jeffrey N. Giunta; Fleit Gibbons Gutman Bongini & Bianco P.L.

(57) ABSTRACT

Provided herein are teachings directed to overcoming the problem of erroneous color reproduction on a color output device such as a color display. The teachings herein provide a system and apparatus for correcting color image data input to a display device by displaying a target of color patches of known input values on the display device, and capturing an image of the target with a digital camera. This is followed by extracting camera signals from the image which correspond to the color patches, and deriving a tone response calibration for the projector from the camera signals and the input values.

21 Claims, 5 Drawing Sheets

U.S. PATENT DOCUMENTS

2007/0269105 A1* 11/2007 Zhang et al. ................ 382/165
2008/0021584 A1* 1/2008 Whaite et al. ............... 700/109

OTHER PUBLICATIONS

Kwak et al., "Colour Appearance Comparison between LCD Projector and LCD Monitor Colours", 2002, SPIE, pp. 599-602.*

Raja Bala et al., U.S. Appl. No., filed simultaneously herewith, titled "A Camera-Based Method for Calibrating Color Displays".

Y. Kwak, L. W. MacDonald, "*Method For Characterising An LCD Projection Display*", Projection Displays VII, SPIE Proceedings 4294, pp. 110-118, 2001.

J. Hardeberg, L. Seime, T. Skogstad, "*Colorimetric Characterization Of Projection Displays Using A Digital Colorimetric Camera*", Gjovik University College, Gjovik, Norway, pp. 1-11 (Reprint of paper to appear in SPIE Proc. 5002, Pojection Displays IX (Electronic Imaging 2003).

* cited by examiner

CAMERA-BASED SYSTEM FOR CALIBRATING COLOR DISPLAYS

CROSS-REFERENCE TO RELATED APPLICATIONS

Cross reference is made to the following application filed concurrently herewith: Ser. No. 11/012,994 entitled "A Camera-Based Method For Calibrating Color Displays" to inventors, Raja Bala, Karen M. Braun, and Robert J. Rolleston, the disclosure of which is totally incorporated by reference herein. The appropriate components and processes of the above co-pending application may be selected for the invention of the present application in embodiments thereof.

BACKGROUND AND SUMMARY

The teachings presented herein relate generally to calibration of output devices. The teachings presented herein relate more specifically to calibration of color displays.

An ever increasing number of presentations today are given electronically using projection display technology. However, in such presentations, color images often do not reproduce correctly due to lack of projector calibration. In cases where the color imagery is intended to convey an important message, this problem can severely diminish the value of a presentation. Examples include technical, educational, and marketing presentations attempting to demonstrate color and image quality effects. Readability of text and other details are often compromised as well, and often the presenter is compelled to apologize, insisting, "It looked good on my computer screen."

A standard approach for determining the projector's tone response is to make device-independent measurements of R, G, B ramps with a spectroradiometer, and then derive a tone response function that relates digital input value to luminance by fitting or interpolating the measured data. This type of approach can be expected to produce a highly accurate correction. However, making spectroradiometric measurements is a very expensive, time-consuming and tedious process. Indeed this is the reason why projection display calibration is typically avoided, and users simply live with and otherwise tolerate the erroneous result.

What is needed is a straight forward easy to perform calibration for projection displays which does not require expensive test equipment or special involved operator skills or training to accomplish.

Disclosed in embodiments herein is a system for color correction, comprising an output device to be color corrected; a target of patches of known input values displayed on the output device; a digital camera capturing an image of the target of patches as rendered by the output device and providing image signals representative of the captured image of the target of patches; and a software calibration tool receiving the provided image signals and deriving a tone response calibration for the output device from a comparison of the provided image signals and the known input values.

Further disclosed in embodiments herein is a system for color correction of a display device, comprising a target of patches of known input values displayed on the display device; a digital camera capturing an image of the target of patches as displayed by the display device thus providing image signals representative of the captured image of the target of patches; and a software calibration tool receiving the provided image signals, from which the software calibration tool extracts calibrated camera signals, to thereby derive a tone response calibration for the display device by a comparison of the extracted calibrated camera signals and the known input values.

Further disclosed in embodiments herein is a system for color correction of a digital projection display with a digital camera, comprising a target of patches of known input values displayed on the digital projection display that the digital camera captures as displayed by the digital projection display and which the digital camera provides as image signals representative of the captured image of the target of patches. The system further comprises a processor receiving from the digital camera the image signals representative of the captured image of the target of patches, and a calibration tool resident on the processor that extracts calibrated camera signals from the image signals representative of the captured image of the target of patches, and thereby derives a tone response calibration for the digital projection display by a comparison of the extracted calibrated camera signals and the known input values.

DETAILED DESCRIPTION

Figure 1:
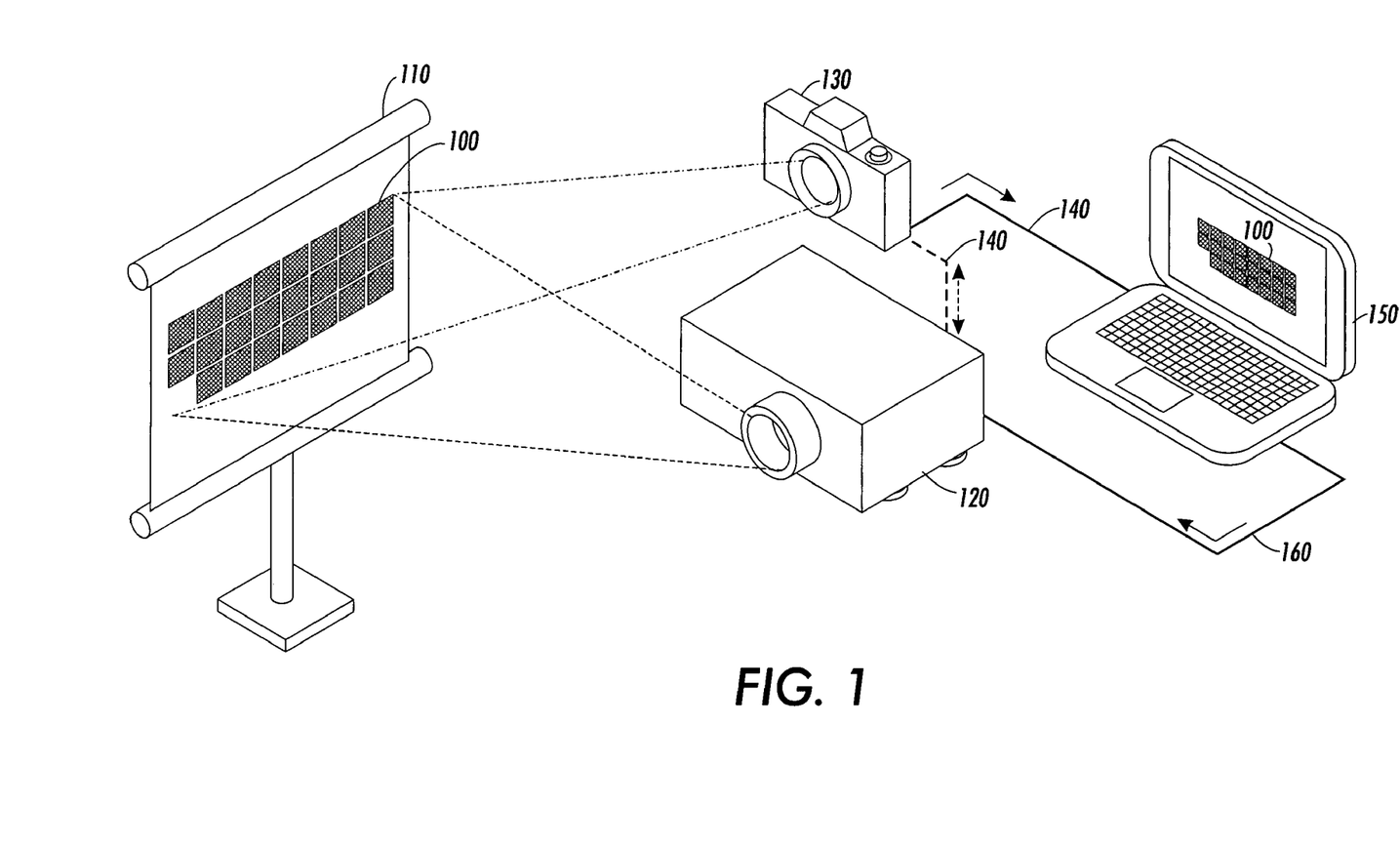
FIG. 1 shows a system representation suitable for performing the teachings provided herein.

A methodology is herein taught for calibrating an output device including a display, using a digital camera as a color measurement device. It is to be understood that the term "display" may include the cathode ray tube (CRT), desktop liquid crystal display (LCD), projection LCD, digital light projector (DLP), and other similar technologies. It will also be understood by those skilled in the art that the term "digital camera" may include a standard digital still camera, cameraphone, video camera with still image capture, web camera, and other similar technologies. To explain the teachings provided herein, embodiments using a projection display and digital still camera will be used as example devices. As shown in FIG. 1, a target of known RGB values 100 is projected on the screen 110 by projector 120, and captured with the digital camera 130. The collected camera signals 140 are then corrected in processor 150 to produce luminance signals, and the latter are used to calibrate the tone response of the projector 120. A number of techniques exist to correct the collected camera signals 140. One preferred embodiment performs an "on-site" camera 130 based correction from the said projected target 100. The advantages with this methodology include: 1) sufficiently accurate tone response correction which is entirely satisfactory in most applications; and, 2) the use of a common consumer digital camera 130, thus eliminating the need for costly and tedious measurement tasks.

Figure 2:
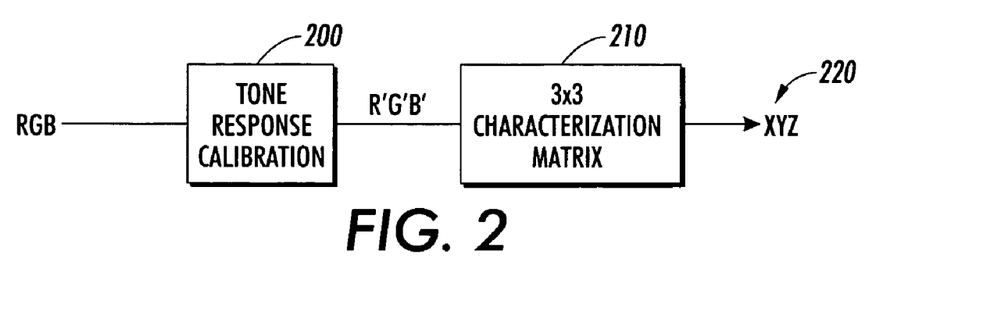
FIG. 2 depicts a simple flow chart for color calibration.

Display devices 120 typically conform to an additive color mixing model. According to this model, the relationship between RGB signals driving the device 120, and XYZ tri-stimulus values produced by the display is as shown in FIG. 2. The first step to be performed (in one preferred embodiment by processor 150) is a tone response calibration 200, which linearizes each of the R, G, and B channels to luminance. In a second step 210, the linearized signals, R', G', B' are related to XYZ tri-stimulus values 220 via a 3×3 characterization matrix, determined by the colors of the R, G, B phosphors and the display white point. For greatest accuracy, both the tone calibration and the 3×3 matrix should be derived for each display 120. However for many practical applications, entirely sufficient accuracy is achieved by deriving only the tone calibration, and using a fixed generic 3×3 characterization matrix such as the sRGB standard. Thus the teachings provided herein focus on a tone response calibration 200.

Figure 3:
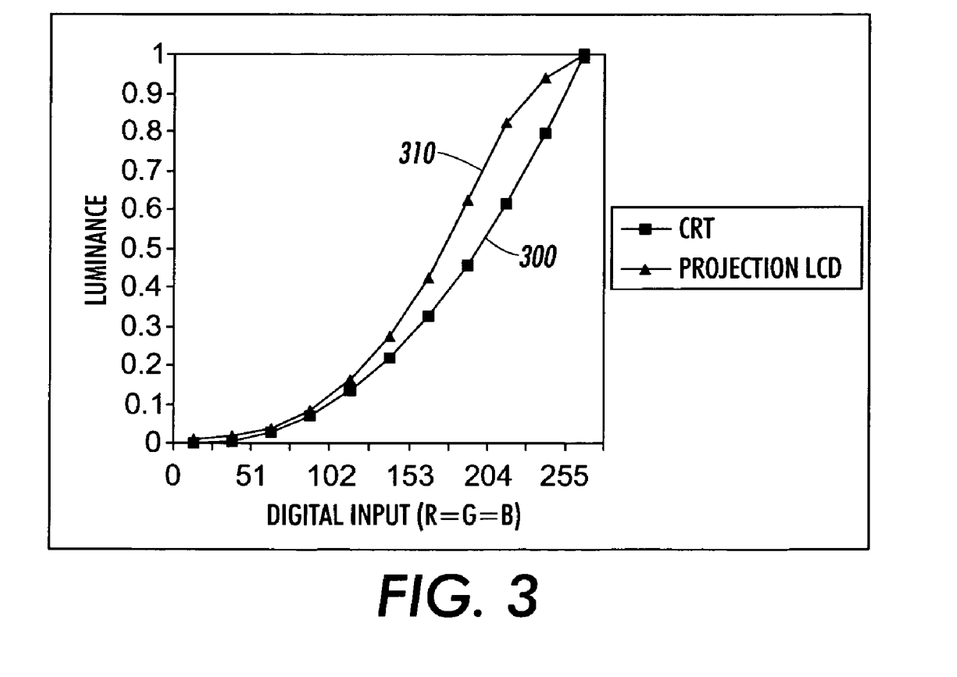
FIG. 3 shows a graph of luminance response for a given input signal into either a CRT or alternatively a projection LCD display.

The tone response of a typical CRT is accurately modeled by a gamma-offset-gain (GOG) model. A common simplification is to assume offset=0, gain=1. This reduces the model to:

$$R' = R^\gamma \quad G' = G^\gamma \quad B' = B^\gamma \tag{1}$$

where R,G,B and R',G',B' are normalized to the range 0-1, and the exponent γ is often referred to as "gamma". The curve 300 in FIG. 3 is a plot of Equation (1) with γ=2.2.

Due to the predominance of CRT displays in the past, it has been common practice to prepare electronic RGB images for rendition to such devices. In recognition of this fact, the sRGB color space was developed to represent an average CRT display, and serves today as the main de-facto standard for electronic RGB imagery. Indeed many scanner and digital camera manufactures apply post-processing to the captured images to transform them approximately to sRGB. The CRT plot 300 in FIG. 3 is a close approximation of the sRGB tone response.

Digital projection displays 120 are commonly used for giving electronic presentations. Several technologies are available, of which liquid crystal displays (LCD) are perhaps the most common. Although LCDs conform to the same basic additive model shown in FIG. 2, their tone response characteristics can be markedly different from that of CRTs. The projection LCD curve 310 in FIG. 3 is the tone response of a typical portable LCD projector. The plot was derived from radiometric measurements of 11 neutral (R=G=B) patches projected on the screen under dark-room conditions. The difference between the tone response of the projection LCD and CRT is quite apparent. The consequence is that if an sRGB image, prepared for display on a CRT, is rendered directly to a projection LCD 120 (as is commonly done today), the reproduction is grossly incorrect. This level of image quality is clearly unacceptable in cases where the color reproduction is critical to the value of the presentation. Examples include technical, educational, and marketing presentations attempting to demonstrate subtle color and image quality effects.

A method is therefore needed to accurately calibrate the projector's tone response. This requires the following basic steps:

1) Establish the built-in projector settings (typically default) and viewing environment (typically a dim or dark-lit room)
2) Generate a color target of known device values. The target should comprise ramps in gray (R=G=B) and/or the primary R, G, B axes.
3) Project the target onto the screen and take device-independent color measurements of the patches.
4) Relate the device values to the device-independent values via a tone response calibration function. Several techniques exist to accomplish the above steps, as are discussed below.

A standard approach for determining the projector's tone response is to make device-independent measurements of R, G, B ramps with a spectroradiometer, and then derive a tone response function that relates digital input value to luminance by fitting or interpolating the measured data [see for example: Y. Kwak, L. W. MacDonald, "*Method For Characterising An LCD Projection Display*", Projection Displays VII, SPIE Proceedings 4294, pp. 110-118, 2001]. The authors J. Hardeberg, L. Seime, T. Skogstad, in their writing "*Colorimetric Characterization Of Projection Displays Using A Digital Colorimetric Camera*" augment the spectroradiometer with a calibrated digital camera to correct for spatial non-uniformities in the projected image. This approach is expected to produce a highly accurate correction. However, making spectroradiometric measurements is a very expensive, time-consuming and tedious process. Indeed this is the reason why projection display calibration is usually avoided, and users simply live with and otherwise tolerate the result.

Figure 4:
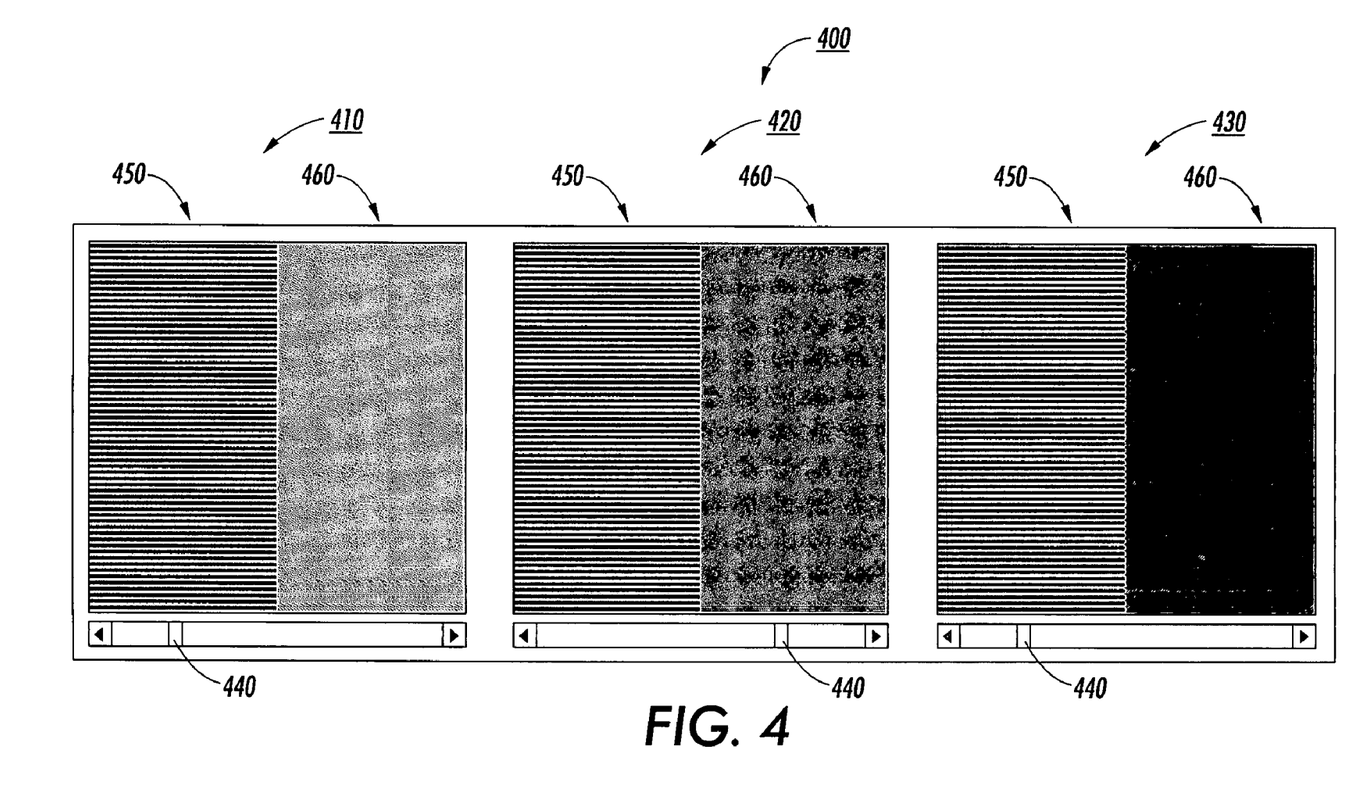
FIG. 4 depicts one possible color calibration interface for user interaction.

An alternative to measurement-based approaches is visual calibration. An exemplary example of a display for visual calibration 400 applied to CRTs is shown in FIG. 4. For each of the R, G, and B primaries, a corresponding red (410), green (420), and blue (430), GUI panel with slider 440 is provided. The left field 450 of each panel (410, 420, & 430) contains a pattern of alternating lines of black in combination with the full-strength primary. Thus the average luminance of the left 450 field is 50% between that of black and full-strength primary, and is thereby a known constant (it will be apparent to those skilled in the art that some other intermediate point other than 50% could be chosen). The user is asked to move the slider 440 to adjust the digital input provided to the right field 460 until the two fields (450 & 460) match visually in luminance. This task establishes one [x-y] pair on the display tone response curve. If one assumes the simplified CRT model in Equation (1) above, this information is sufficient to determine the gamma parameter, which in turn defines the entire tone response.

The visual task in FIG. 4 may be successful for CRT calibration. However, as noted earlier, projection displays often exhibit an "S-shaped" tone response rather than a power-law response. Therefore, an attempt to fit a power-law model to a projector response using the technique in FIG. 4 will produce an incorrect tone calibration. The aforementioned visual technique can be extended to estimate multiple points on the tone response curve. However, this necessarily involves repetitions of the visual tasks in FIG. 4, which can become tedious and error-prone.

Thus an exemplary method is proposed for projection display calibration that addresses the problems that occur with these techniques. The same 4 basic steps described above are still followed. However, a digital camera is used instead of a spectroradiometer to obtain the target measurements in Step 3. This methodology is distinct from the prior art and technique (as for example in J. Hardeberg, L. Seime, T. Skogstad, "*Colorimetric Characterization Of Projection Displays Using A Digital Colorimetric Camera*") in that here the digital camera is the only measurement device used for calibrating the projector 120. Furthermore, the exemplary method does not require a sophisticated camera—a common consumer device will suffice.

Advantages with this approach are:

i) consumer digital cameras abound today as an inexpensive commodity item;
ii) digital cameras are easy to use in comparison to spectral measurement devices;
iii) a digital camera can capture a fairly large spatial footprint, thus allowing for measurement of a large number of patches, and/or greater spatial averaging.

However, Issues to address with this approach are:

a) since device-independent measurements are needed, the camera itself needs to be calibrated for the projected medium it is capturing;
b) the camera may drift over time, thus invalidating the data it captures.

Figure 5:
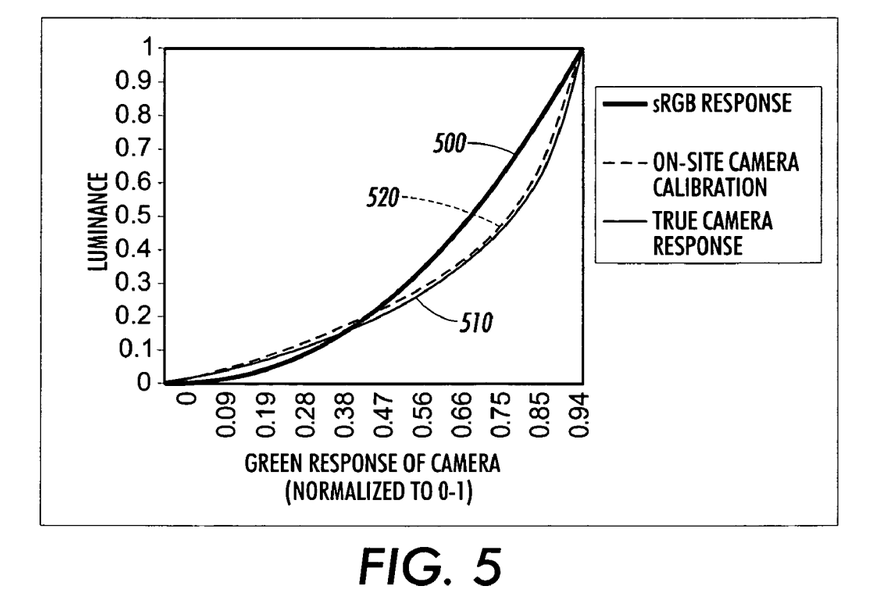
FIG. 5 shows a normalized graph of luminance response for a given green input signal response for an on site camera versus the true camera versus sRGB.

Digital camera calibration and characterization has engendered a large body of research literature. As mentioned earlier, manufacturers of consumer cameras often incorporate a built-in correction to produce images in a standard space (often sRGB). As a test to illustrate this, FIG. 5 compares the sRGB tone response (curve 500) with the tone response of the green channel from a Kodak LS443 digital camera (curve 510). The latter was obtained by displaying a gray ramp with the above mentioned LCD projector, and capturing both a digital camera image, and luminance measurements with a PhotoResearch SpectraScan PR705 spectroradiometer. Clearly, the camera tone response deviates noticeably from the sRGB assumption. Furthermore, the response is likely to vary with the particular camera model, camera settings, image capture conditions, and over time. While these factors may not be an issue for casual consumer needs, they may pose a problem in the application at hand, where the digital camera is used as a measurement device. Obtaining calibrated signals from a digital camera requires that the camera itself be calibrated. Many standard approaches exist for camera calibration. However these techniques require spectral or calorimetric measurements of a suitable target, thus making the camera-based approach no less expensive and skill intensive than the original measurement-based display calibration approach. It is therefore preferable to perform some form of "on-site" camera calibration using a projected target, and requiring no spectral or calorimetric measurement.

To this end, an exemplary technique is employed that uses the visual calibration technique described above to calibrate the camera tone response. This is based on the assumption that the camera response can be approximated by a representation akin to the GOG model for CRTs. Recall that the visual task in FIG. 4 produces one calibrated point; i.e. we know the input digital value to the projector that produces the 50% luminance measurement. This point can be included in the projected target and used to calibrate the camera.

Figure 6:
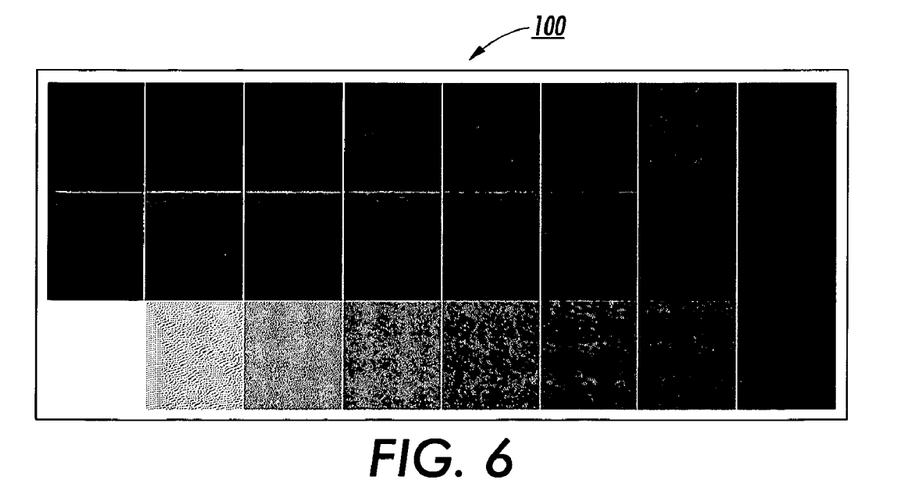
FIG. 6 shows an exemplary target embodiment suitable for performing the teachings provided herein

To illustrate this, consider an exemplary target 100 shown in FIG. 6. This embodiment of the target comprises a ramp of 15 neutral (R=G=B) patches from white to black. One of the patches is the known 50% luminance point obtained from a visual calibration 400 (far right patch 460 in all rows). This patch is duplicated along the entire middle row, and the far-right column, to optionally correct for spatial non-uniformity in the displayed image in the horizontal and vertical directions, respectively. This target 100 is displayed with the projector 120, captured with the digital camera 130, and the camera RGB values 140 are retrieved.

Correction for spatial non-uniformity is an optional step that can be critical for certain displays and cameras. The correction should ideally be a spatial function applied to the captured camera image. However, this approach cannot be implemented with standard color management architectures such as established by the International Color Consortium. A simpler alternative is to pre-correct the camera signals to approximate the effect of displaying each patch at a single chosen reference location. This allows calibration to be derived from well-behaved data, although it is strictly valid only at the reference location. One exemplary method of spatial nonuniformity correction applied to a camera signal $C(i,j)$ corresponding to the patch located at row i and column j in the target is given by:

$$C'(i,j)=C(i,j)*S_1(j)*S_2(i) \qquad (2)$$

where $C'(i,j)$ is the camera signal corrected for spatial non-uniformity, and $S_1$ and $S_2$ are spatial correction factors in the horizontal and vertical directions, respectively. $S_1$ is derived from camera signals obtained from the constant-input row of patches in the target. Similarly, $S_2$ is derived from camera signals obtained from the constant-input column of patches in the target. One example of a horizontal correction factor is given by:

$$S_1(j)=C(i_{const},j_{ref})/C(i_{const},j) \qquad (3)$$

where $i_{const}$ refers to the index of the constant-input row, and $j_{ref}$ is the column index for the reference location. In the example target of FIG. 6, the constant-input row is the second row, therefore $i_{const}=2$. If the reference patch is chosen to be near the center of the target, for example the patch in the second row and fourth column, then $j_{ref}=4$. An analogous formulation applies for $S_2$ in the vertical direction. The aforementioned spatial non-uniformity correction can be applied to the camera signals before or after camera calibration is applied. This operation is described next.

Three points from the target are used to calibrate the camera 130: namely white, black, and the 50% luminance point. In addition, perfect black (i.e. 0 luminance) is used to pin the one endpoint of the camera 130 response. Table 1 summarizes the data used to calibrate the camera 130 response. Luminance is normalized to that of projector white, so that by definition, $Y_w=1$. The only unknown parameter is the luminance of the projector black point, $Y_b$. This flare factor is affected by the characteristics of the projector 120, screen 110, and the ambient room illumination. We assume 2% flare (i.e. $Y_b=0.02$) based on empirical a priori radiometric measurements from different projectors in a dim surround. (This parameter can be tuned based on additional knowledge of the projector and viewing environment.)

TABLE 1

Data used to calibrate the tone response of the digital camera

| Patch | Luminance | Captured camera signal |
|---|---|---|
| Projector white | $Y_w = 1$ | $R_1, G_1, B_1$ |
| Projector black | $Y_b$ | $R_2, G_2, B_2$ |
| Mid-gray | $(Y_w + Y_b)/2 =$ $(1 + Y_b)/2$ | $R_3, G_3, B_3$ |
| Perfect black | 0 | 0, 0, 0 |

The four points in Table 1 can then be used to determine the relationship between camera RGB 140 and luminance. One approach is to fit a GOG model to the data. An empirical alternative is to simply interpolate the four points. Due to its simplicity, we adopted the latter approach with cubic spline interpolation. The dashed line 520 in FIG. 5 shows the camera 130 tone response derived from this approach. Comparing this to the true camera response (black curve), we note that the technique is very accurate.

Once the camera 130 is calibrated, it is effectively turned into a luminance measurement device. Thus the luminance of all 15 patches in the projected exemplary gray ramp target 100 depicted in FIG. 5 can be derived. These luminance values and the corresponding digital values driving the projector 120 are then used to generate a tone response calibration 160 for the projector using straightforward interpolation techniques. In our implementation a cubic spline was used to interpolate among the 15 points from the target.

The benefit of this approach is that since the same target 100 is used to calibrate both the camera 130 and the projector 120, the dependence of the camera 130 response on capture conditions (i.e. projection media, image content, camera settings, etc.) is effectively calibrated out. The exemplary correction technique is thus very robust to projection and capture conditions.

Figure 7:
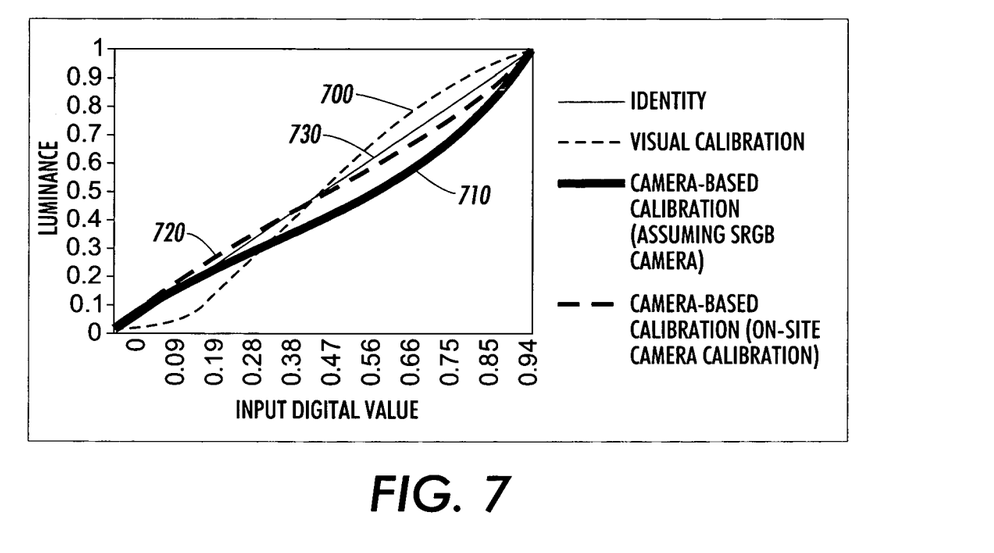
FIG. 7 shows a graph providing a comparison of calibration results.

FIG. 7 is a plot of the luminance response along the neutral (R=G=B) axis for one sample projector 120 as calibrated with different techniques. For reference, an identity transform is included as the thin black line 730, and represents perfect calibration. The visual calibration technique 700 is clearly inadequate as explained above. Camera-based calibration 710, wherein the camera is simply assumed to be an sRGB device, is also inadequate as it does not adequately linearize the projector. (The invalidity of the sRGB assumption will vary across different cameras) Finally, we note that the on-site camera calibration 720 achieves exemplary performance in terms of linearizing the projector.

To recapitulate, an exemplary methodology as taught herein provides an integrated calibration tool that accomplishes the following process:

1. The calibration tool displays a visual GUI pattern 400 (e.g. FIG. 4) on the screen 110.
2. The user performs the required visual tasks to establish the 50% luminance point.
3. The calibration tool displays a ramp target 100 (e.g. FIG. 6) on the screen. The 50% point from step 2 is included in this target 100.
4. The user captures an image of this target 100 as projected onto screen 110 with a digital camera 130, and downloads that captured image data 140 to the software calibration tool resident on processor 150.
5. The software calibration tool resident on processor 150: a) extracts RGB patch values from the camera image 140; b) calibrates the camera response with selected patch values; c) converts the camera responses to luminance values using the camera calibration; and d) uses the digital values driving the projector and the luminance values from step c) for all patches to create a tone response correction (TRC) 160 for the projector 120.
6. The TRC 160 is exported for subsequent correction of images and documents to projector 120.

This calibration tool can be built with a Java GUI (Graphical User Interface) and underlying software functionality. The software calibration tool may either reside on the host computer driving the projector 150 or on a remote server. Step 6 as presented above can be accomplished by building an ICC profile for the projection display 120, which can then be invoked by the operating system or other applications such as page description language software, e.g. Adobe® Acrobat® to create a PDF file. Alternatively, if the video LUTs (Look Up Tables) driving the projection display 120 are accessible, the projector 120 may be directly corrected. In this case, the projector 120 could be turned into an "sRGB emulator", thus properly reproducing most existing color imagery.

As will be clear to one skilled in the art, the calibration tool may be provided as a software platform, a software platform operating on a hardware platform or even provided as hardwired logic. The calibration tool may be resident on an outboard personal computer or provided inboard of the projector. In the latter case the digital camera would necessarily connect directly to the projector for the above calibration methodology to be performed.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for color correction, comprising:
    an output device to be color corrected;
    a target of patches, each patch in the target of patches having a respective known input value displayed on the output device, the target of patches comprising;
        at least one base patch having a predefined calibration input value; and
        a plurality of calibration patches comprising separate patches each having a respective input value corresponding to a different known respective luminance value different than the predefined calibration input value;
    a common digital camera capturing an image of the target of patches as rendered by the output device and providing image signals representative of the captured image of the target of patches; and
    a software calibration tool receiving the image signals, the software calibration tool performing:
        camera calibration of the common digital camera based upon a relationship between the image signals corresponding to the at least one base patch and the predefined calibration input value;
        calibrating the image signals corresponding to the calibration patches based upon the camera calibration to produce calibrated image signals;
        deriving a tone response calibration for the output device based upon a measured relationship between the calibrated image signals corresponding to the plurality of calibration patches, and the respective input value of each of the plurality of calibration patches; and
        color correcting, based upon the tone response calibration, the output device.

2. The system for color correction of claim 1 wherein at least one of the plurality of calibration patches is further duplicated at multiple spatial locations on the target to provide duplicate patches, and the software calibration tool uses the provided image signals corresponding to the duplicated patches to correct the output device for spatial non-uniformity within the captured image of the target of patches.

3. The system for color correction of claim 1, further comprising a processor as a hardware platform to support the software calibration tool.

4. The system for color correction of claim 3 where the display device is a projector.

5. The system for color correction of claim 4 wherein the processor is provided as a personal computer.

6. The system for color correction of claim 4 wherein the processor is provided internal to the projector.

7. A system for color correction of a display device, comprising:
    a target of at least one patch for the calibration of cameras, comprising at least one base patch having a predefined calibration input value;
    a target, displayed on the display device, comprising a plurality of calibration patches comprising separate patches each having a respective input value corresponding to a different known respective luminance value different than the predefined calibration input value;

a common digital camera capturing an image of the target of patches and the target of at least one patch for the calibration of cameras as are displayed by the display device and providing image signals representative of the captured image of the target of patches and the target of at least one patch for the calibration of cameras; and a software calibration tool receiving the image signals, from which the software calibration tool performs:

camera calibration of the common digital camera based upon a relationship between the image signals corresponding to the at least one base patch and the predefined calibration input value;

calibrating the image signals corresponding to the calibration patches based upon the camera calibration to produce calibrated image signals;

deriving a tone response calibration for the display device based upon a measured relationship between the calibrated image signals corresponding to the plurality of calibration patches, and the respective input value of each of the plurality of calibration patches; and color correcting, based upon the tone response calibration, the display device.

8. The system for color correction of claim 7, further comprising a processor as a hardware platform to support the software calibration tool.

9. The system for color correction of claim 8 where the display device is a projector.

10. The system for color correction of claim 9 wherein the processor is provided as a personal computer.

11. The system for color correction of claim 9 wherein the processor is provided internal to the projector.

12. A system for color correction of a digital projection display with a common digital camera, comprising:

a base target with a base patch having a predefined calibration input value;

a calibration target with a plurality of calibration patches comprising separate patches each having a respective input value corresponding to a different known respective luminance value, the base target and the calibration target displayed on the digital projection display that the common digital camera captures as displayed by the digital projection display, and for which the common digital camera provides image signals representative of the captured image of the base target and the calibration target;

a processor receiving from the common digital camera the image signals representative of the captured image of the base target and the calibration target; and a calibration tool resident on the processor that performs:

camera calibration of the common digital camera image signals based upon a relationship between the image signals corresponding to the base target and the predefined calibration input value, extracts, based upon the camera calibration, calibrated camera signals from the image signals representative of the captured image of the calibration target, and derives a tone response calibration for the digital projection display to correct the digital projection display by a comparison of the extracted calibrated camera signals for each patch within the calibration patches and its respective input value.

13. The system for color correction of claim 12 wherein at least one of the plurality of calibration patches is further duplicated at multiple spatial locations on the target of patches to provide duplicated patches, and the processor uses the received image signals corresponding to the duplicated patches to correct for spatial non-uniformity within the captured image of the target of patches and thus correct the spatial uniformity of the digital projection display.

14. The system for color correction of claim 12 wherein the processor is provided as a personal computer.

15. The system for color correction of claim 12 wherein the processor is provided internal to the projector.

16. The system for color correction of claim 12 further comprising a visual graphical user interface pattern displayed on the digital production display for facilitating manual adjustment of the digital projection display to correctly display inputs corresponding to a known intermediate luminance point.

17. The system for color correction of claim 16 where the target of patches includes a patch representative of the known intermediate luminance point.

18. The system for color correction of claim 12 wherein the processor is provided on a remote server.

19. The system for color correction of claim 12 wherein the calibration tool is provided as a Java graphical user interface and application software.

20. The system for color correction of claim 12 wherein a cubic spline interpolation is employed in the comparison of the extracted calibrated camera signals and the known input values.

21. The system for color correction of claim 12 wherein the base patch and the plurality of calibration patches are provided as but one target displayed by the digital projection display.

* * * * *